United States Patent [19]

Derderian

[11] Patent Number: 4,633,116
[45] Date of Patent: Dec. 30, 1986

[54] SUB-SLOT COVER FOR DYNAMOELECTRIC MACHINE

[75] Inventor: Scott K. Derderian, Salem, Mass.

[73] Assignee: General Electric Company, Lynn, Mass.

[21] Appl. No.: 793,407

[22] Filed: Oct. 31, 1985

[51] Int. Cl.$^4$ .............................................. H02K 3/48
[52] U.S. Cl. ..................................... 310/214; 310/42; 310/61; 310/64; 310/215
[58] Field of Search .................. 310/42, 214, 215, 52, 310/55, 57, 58, 59, 60 R, 60 A, 61, 64, 65, 194, 45, 261

[56] References Cited

U.S. PATENT DOCUMENTS

| | | | |
|---|---|---|---|
| 2,783,399 | 2/1957 | Fenemore | 310/64 |
| 2,787,721 | 4/1957 | Tudge | 310/61 |
| 3,119,033 | 1/1964 | Horsley | 310/64 |
| 4,251,745 | 2/1981 | Germann | 310/58 |
| 4,321,498 | 3/1982 | Vogt | 310/215 |
| 4,560,896 | 12/1985 | Vogt | 310/215 |

*Primary Examiner*—R. Skudy
*Attorney, Agent, or Firm*—James W. Mitchell

[57] ABSTRACT

In a dynamoelectric machine including a rotor of electrically conductive material having a plurality of axially extending slots for receiving electrical conductors, there is provided apparatus in each slot for electrically insulating the conductors from the rotor. The insulating apparatus comprises a substantially U-shaped insulating member of an aramid paper extending axially along the length of the slot. The base of the U-shaped insulating member is held in position by a sub-slot cover formed of an extruded plastic material which has an inner member covering an axially extending sub-slot located beneath each of the conductor slots of the rotor and an outer member which fits over the top of the base of the U-shaped insulation member and latches into the inner member. Both the outer and inner members of the sub-slot cover have molded apertures for allowing the passage of cooling air and the U-shaped insulation member has a corresponding aperture whereby the cooling air can be passed through the sub-slot and forced outward through the windings of the rotor. In one embodiment, the sub-slot covers are formed to be substantially less than the axial length of the rotor and a plurality of the covers may be utilized in an interlocked relationship to form a continuous cover extending the length of the axial direction of the rotor.

16 Claims, 4 Drawing Figures

SUB-SLOT COVER FOR DYNAMOELECTRIC MACHINE

BACKGROUND OF THE INVENTION

This invention relates to dynamoelectric machines and, in particular, to dynamoelectric machines of the type including a rotor having electrically conductive windings disposed in a plurality of axially extending slots.

A dynamoelectric machine includes a rotor body having a plurality of axially extending slots into which electrical windings are inserted. The rotor body is generally a steel material whereas the rotor windings comprise a plurality of copper wires. In a direct-cooled dynamoelectric machine each slot may further include an axially extending sub-slot for ventilation and cooling. The direct-cooled machine is one which is cooled directly by the atmosphere in which it is disposed, e.g., air or hydrogen. The sub-slots are part of a ventilation scheme, known in the art, for transferring gas coolant axially along the rotor. Each slot also includes provision for the radial flow of gas coolant, primarily through ventilation slots in the windings.

In the aforementioned machine it is necessary to electrically insulate the rotor windings from the rotor body, such insulation taking the form of nonconductive "slot-armor". One such insulation is shown in U.S. Pat. No. 4,321,498 to Vogt and assigned to the assignee of the present invention. In that patent, herein incorporated by reference, it is suggested that a preferred embodiment of the invention would include a pair of electrical insulating members (slot armor), each member comprising a radially extending portion terminating in a base leg, the electrically insulating members disposed in each slot so that the radially extending portions are adjacent opposite slot walls and the base legs extend towards one another. In addition, there is an axially extending base (sub-slot cover) having opposite sides formed with axially extending grooves for accepting therein each opposite base leg whereby an interlocking joint is formed between the sub-slot cover and the slot armor. It is further suggested that both the sub-slot cover and the insulating slot armor disposed adjacent the slot walls would be formed from glass laminate material.

The applicants have found it desirable to use an aramid paper such as Nomex (trademark, DuPont Company) as an insulating material for the slot armor. However, in following the teaching of the previous U.S. Pat. No. 4,321,498 they have found that there is a lack of rigidity which occurs in the 90 degree bend at the interlocking section of the insulating member and the base member. Under centrifugal load, the slot armor will migrate up the slot wall pulling away from the interlocking section of the sub-slot cover.

Aramid paper is presently used in conventionally-cooled machines only. Conventionally-cooled machines are described as other than direct-cooled machines. Conventionally cooled machines are machines wherein cooling of the windings occurs by transfer of heat from the windings through the body of the rotor and then into the cooling medium. In the direct-cooled machine, the cooling medium is passed directly through the windings. Aramid paper will exhibit dimensional instability and can increase axially in length as much as one percent under changing conditions of relative humidity. Therefore, even U-shaped aramid paper with punched ventilation slots has been avoided in direct-cooled windings because humidity can cause the registration of the ventilation slots for the sub-slot cover-slot armor and copper to become misaligned, thus reducing the area of cooling paths.

In U.S. patent application Ser. No. 656,571 filed Oct. 1, 1984, now U.S. Pat. No. 4,560,896 and assigned to the assignee of the present invention, there is disclosed one solution to the above stated problem involving aramid paper using a composite aramid paper slot armor and glass laminate sub-slot cover. The slot armor is comprised of axially and radially extending sidewalls joined together by a radially inner, axially extending base portion to form a "U"-shaped channel. The sub-slot cover comprises a planar outer layer (with respect to the rotor centerline) and a planar inner layer. The aramid paper is formed with spaced-apart holes which allow the inner and outer planar layers of the sub-slot cover to be bonded to one another as well as to the aramid paper base portion inserted therebetween. Ventilation slots are thereafter machined into the slot armor sub-slot composite.

Although the solution of the above cited application provides an improved system, it requires a bonding operation followed by a machining operation in order to form the composite structure.

Accordingly, it is an object of the present invention to provide an improved slot insulation for dynamoelectric machine which overcomes the deficiencies of the prior art.

It is another object of the present invention to provide an improved slot insulation for a dynamoelectric machine utilizing a two piece injection molded sub-slot cover in which the first and second piece may be mechanically fastened without the use of a bonding agent.

It is a still further object of the present invention to provide an improved slot insulation for a dynamoelectric machine utilizing a substantially U-shaped aramid paper insulation in combination with an injection molded sub-slot cover in which the sub-slot cover can be mechanically fastened to the insulation to form a composite structure without the use of a bonding agent.

It is still another object of the present invention to provide an improved sub-slot cover for a dynamoelectric machine which can be manufactured in a standard length and mechanically joined to form a continuous axial sub-slot cover.

It is still another object of the present invention to provide an improved sub-slot cover for a dynamoelectric machine wherein the sub-slot cover is formed of two pieces of injection molded insulation material having preformed ventilation holes for mating with ventilation holes in a slot insulation member.

DESCRIPTION OF THE DRAWINGS

For a better understanding of the present invention, reference may be had to the following detailed description taken in conjunction with the accompanying drawing in which.

DETAILED DESCRIPTION OF THE INVENTION

Figure 1:
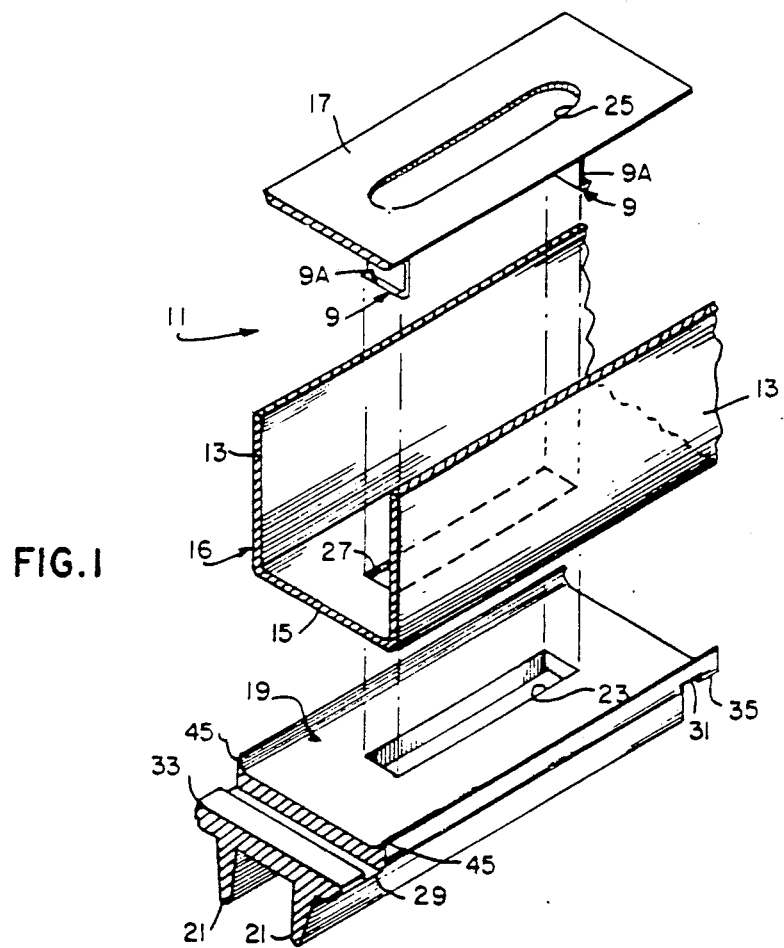
FIG. 1 is an exploded isometric representation of the composite slot armor of the present invention.

Referring now to FIG. 1, the arrow 11 generally designates a composite aramid paper slot armor and glass laminate sub-slot cover. The slot armor is comprised of axially and radially extending side walls 13 joined together by radially inner axially extending base portion 15 to form a U-shaped insulation member 16. The sub-slot cover comprises planar outer member 17, or abutting joint member 17; (with respect to the rotor center line) and a planar inner member 19. As is taught by U.S. Pat. No. 4,321,498, the planar inner member 19 may include radial axially extending fins 21. The planar outer member 17 contains two radially inwardly projecting (with respect to the rotor) clips or tines 9 adapted for engaging against a lower surface of the inner member 19 by passing through an opening or aperture 23 formed in the inner member 19. Another aperture 25 formed in the outer member 17 is arranged to be aligned with the opening 23 in the inner member 19 when the outer and inner members 17 and 19, respectively, are latched together. The base 15 of the U-shaped channel member 16 also includes an aperture 27 which can be aligned with the apertures 23 and 25 to thereby form a ventilation channel through the composite slot insulation or slot armor.

The inner member 19 includes transverse grooves 29 and 31 located at each end thereof to define an interlocking mechanism for a plurality of the sub-slot covers. A land 33 defined by an end of the member 19 and the groove 29 is machined or molded to be below the plane of the upper surface of the member 19 to allow abutting members 19 to fit together and form a smooth, continuous surface. In this regard, a land 35 on the end of the member adjacent the groove 29 is also machined or molded to be above a plane of the lower surface of the member 19 so as to cooperate with the groove 29 and land 33 in order to form a smooth, interlocking joint.

When the outer member 17 is mated with the inner member 19, the tines 9 pass through the aperture 27 and the aperture 23 to interlock the U-shape channel member 16 against the inner slot cover member 19. The tines 9 include shoulder members 9A which latchably engage against the lower surface of the member 19 to capture and restrain the U-shaped channel member 16. The tines 9 are formed as an integral part of the outer member 17, preferably during an injection molding process, and are preferably formed of a creep resistant plastic material so as to exert an outward pressure against the axial ends of the slot 23 to prevent being loosened during operation of the dynamoelectric machine. Preferably, the outer and inner members 17 and 19, respectively, are formed of a high temperature engineering thermoplastic such as Ultem polyetherimide resin, available from General Electric Company. The outer and inner members may be injection molded in the shape illustrated in FIG. 1. The U-shaped channel member 16 may be formed of a single sheet of 0.030 inch aramid paper (DuPont Nomex 410) which is hot formed into the U-shaped channel member 16. The apertures 27 may be punched in the paper by means well known in the art.

Figure 2:
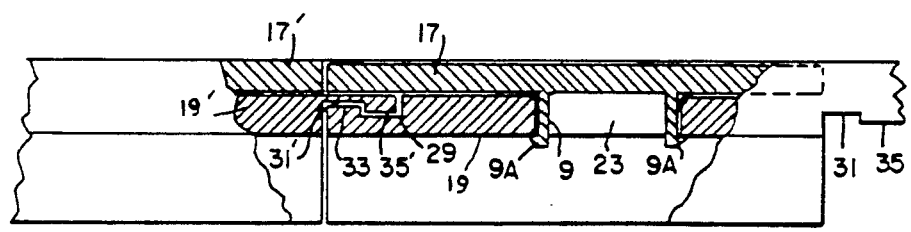
FIG. 2 is a partial cutaway side view of the sub-slot cover of FIG. 1 with the insulation removed illustrating the interlocking land and groove arrangement for adjacent sub-slot covers.

Referring now to FIG. 2, there is shown a side planar view, with a partial cutaway, of the members 17 and 19 illustrating the interlocking relationship of two adjacent covers. The groove 29 and land 33 of member 19 are dimensioned and positioned so as to interlock with the groove 31' and land 35' of member 19' to prevent axial displacement of adjacent covers. The outer member 17 extends to the far left end, as viewed in FIG. 2, of the inner member 19 to thereby overlay the interlocking rabbet joint between members 19 and 19'. Member 17 will therefore prevent separation of the joint. FIG. 2 also illustrates the tines 9 passing through aperture 23 with shoulder members 9A engaging against a lower surface of member 19.

Figure 3:
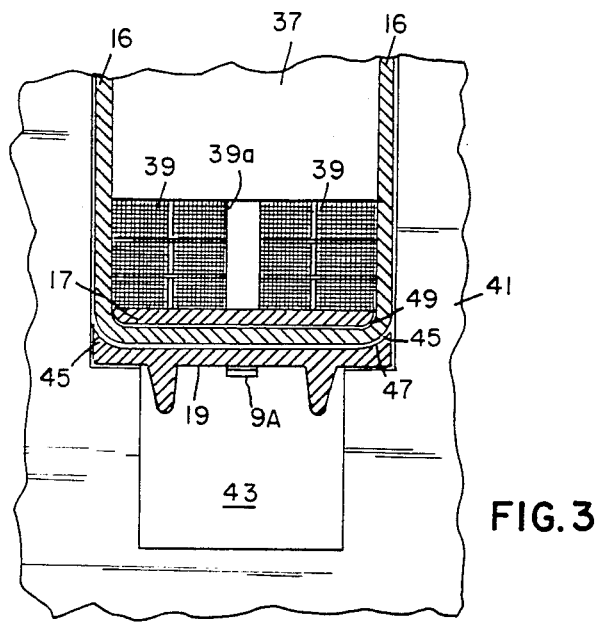
FIG. 3 is an end view of a slot area of a dynamoelectric machine rotor showing the assembly of a slot insulation to the rotor slot.

FIG. 3 is an end view of a portion of a dynamoelectric machine rotor which has a channel shaped slot 37 for containing rotor field windings 39. The windings 39 are typically current carrying copper wires which must be electrically insulated from the electrically conductive rotor body indicated at 41. Applicant's invention is shown accomplishing this desired result by use of the U-shaped slot insulation member 16 in combination with sub-slot cover members 17 and 19. The member 19 is positioned over a sub-slot 43 which, as discussed supra, provides a pathway for a coolant to be forced beneath the windings 39 and upward through the windings through radial passage 39A via the aligned apertures 23, 25 and 27 in the sub-slot cover members 17 and 19 and insulation member 16. (The apertures 23, 25 and 27 are shown in FIG. 1).

As will be apparent from the end view of FIG. 3, the inner member 19 includes outwardly extending side edges 45 having a slight inner radius at 47 allowing the insulation material of member 16 to bend gradually and reduce the potential for breakage at the bend. The outer member 17 has corresponding radial or beveled surfaces 49 to smoothly force the member 16 against the outer surface of member 19.

Figure 4:
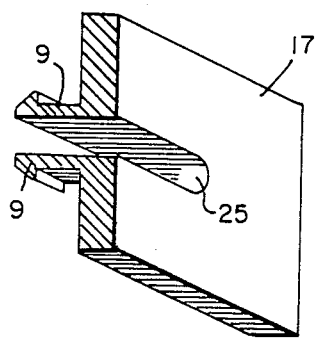
FIG. 4 is a perspective view in partial cross-section of an alternate embodiment of an outer portion of the inventive slot cover illustrating an integrated mechanical fastener.

Referring now to FIG. 4, there is shown a partial perspective, cross-sectional view of an alternate form of the upper member 17 illustrating a design in which the depending tines 9 are formed along the sides of the slot 25 rather than at the ends thereof.

It will be appreciated that what has been disclosed is an improved slot armor for a dynamoelectric machine utilizing injection molded sub-slot covers which may be mechanically interlocked to form a composite slot armor without the necessity of bonding the sub-slot covers to the U-shaped channel members and without subsequent machining operations in order to form ventilation slots or apertures through the composite slot armor. Accordingly, there has been provided an improved apparatus for constructing a composite slot armor for a dynamoelectric machine.

While the invention has been disclosed in what is presently considered to be a preferred embodiment, other modifications may occur to those having skill in the art. It is intended therefore to cover in the appended claims all such modifications which fall within the true spirit and scope of the invention.

What is claimed is:

1. In a dynamoelectric machine including a rotor, a plurality of axially extending slots and sub-slots in the rotor for receiving electrical conductors, means in each slot for electrically insulating the conductors from the rotor comprising:
- a substantially U-shaped insulating member having an axially extending base and a pair of axially and radially extending legs, said legs extending along sides of the slot between the conductors and the rotor with said base adjacent at least one of the sub-slots; and
- a sub-slot cover having a first portion for positioning adjacent the sub-slot for supporting said base of said insulating member and having a second portion latchably attachable to said first portion through said base.

2. The invention of claim 1 wherein said sub-slot cover includes at least one aperture for allowing the passage of fluid ventilation therethrough, said insulating member base having an opening aligned with said aperture.

3. The invention of claim 2 wherein said second portion includes at least two depending tines, said tines passing through said aperture and engaging said first portion for thereby latchably attaching said second portion to said first portion.

4. The invention of claim 3 wherein each of said tines include outwardly extending shoulders for latching against a lower surface of said first portion.

5. The invention of claim 1 wherein said sub-slot cover has a length substantially less than the axial length of the rotor, a plurality of said sub-slot covers being axially aligned in each of the slots to effect a continuous cover over the length of the sub-slot.

6. The invention of claim 5 wherein each of said sub-slot covers is provided with a transverse groove at each end thereof, each said groove being positioned so as to form an interlocking joint with an abutting end of another of said covers.

7. The invention of claim 6 wherein said grooves are formed in said first portion of said cover.

8. The invention of claim 6 wherein said groove is formed on an upper surface at one end of said first portion and on a lower surface at a second end of said first portion, said grooves establishing a land between each said groove and an adjacent end of said first portion, whereby abutting covers may be united by a rabbet joint.

9. The invention of claim 8 wherein said second portion is co-extensive with at least one end of a corresponding one of said first portions whereby said second portion overlaps said rabbet joint.

10. The invention of claim 9 wherein a second end of said second portion terminates adjacent an edge of a corresponding one of said grooves whereby an abutting joint is formed by adjacent ones of said second portions.

11. The invention of claim 10 wherein each said first portion includes first and second radially inward extending fins running axially thereof, and extending into said one of said sub-slots.

12. The invention of claim 1 wherein said first portion includes outwardly extending edges along the axial direction of the rotor.

13. The invention of claim 12 wherein said second portion includes beveled side edges corresponding to said outwardly extending edges of said first portion.

14. The invention of claim 1 wherein said first portion includes at least one fin running axially with respect to the rotor and extending into said one of said sub-slots.

15. A sub-slot cover for a dynamoelectric machine of the type have an axially extending slot in a rotor for receiving a rotor winding, a sub-slot formed radially inwardly of the slot for providing an axial passageway for a ventilating fluid inwardly of the winding, the sub-slot being narrower in cross-section than the slot, and a continuous U-shaped insulation member in the slot, said cover comprising:
- a first planar member for positioning over the sub-slot, said first member having at least one axially oriented aperture;
- a second planar member adapted for mating engagement with said first member, said second member having an aperture substantially aligned with said aperture in said first member; and
- means for latchably engaging said first and said second planar member to capture and restrain the insulation member.

16. The invention of claim 13 wherein said latchably engaging means comprises at least two tines depending from said second planar member and passing through said aperture in said first planar member, each of said tines having outwardly extending shoulders for engaging against a lower surface of said first member.

* * * * *